Oct. 7, 1924.  
A. N. DODS  
PUNCHING MACHINE  
Filed Oct. 24, 1921  
1,511,052  
2 Sheets-Sheet 1
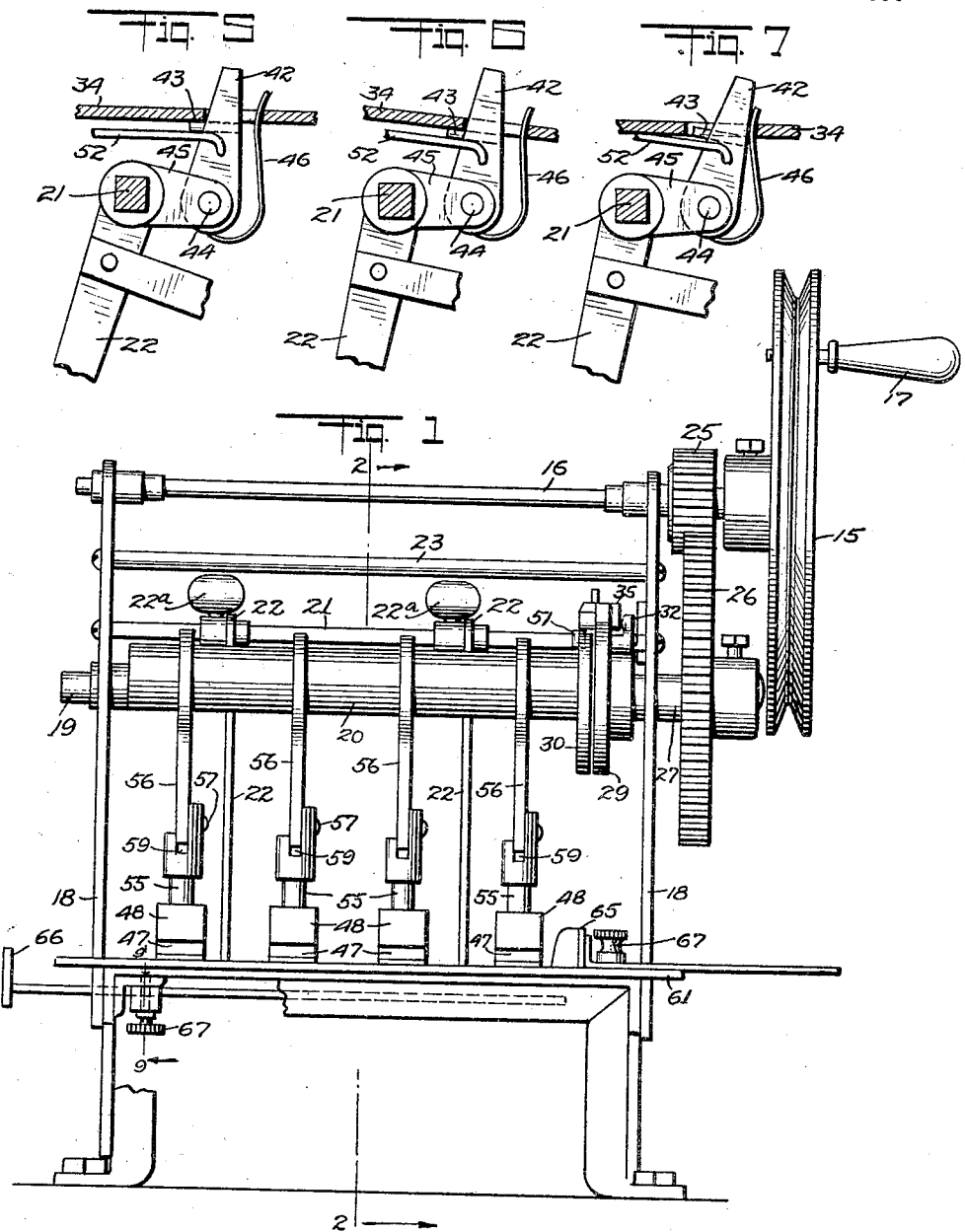

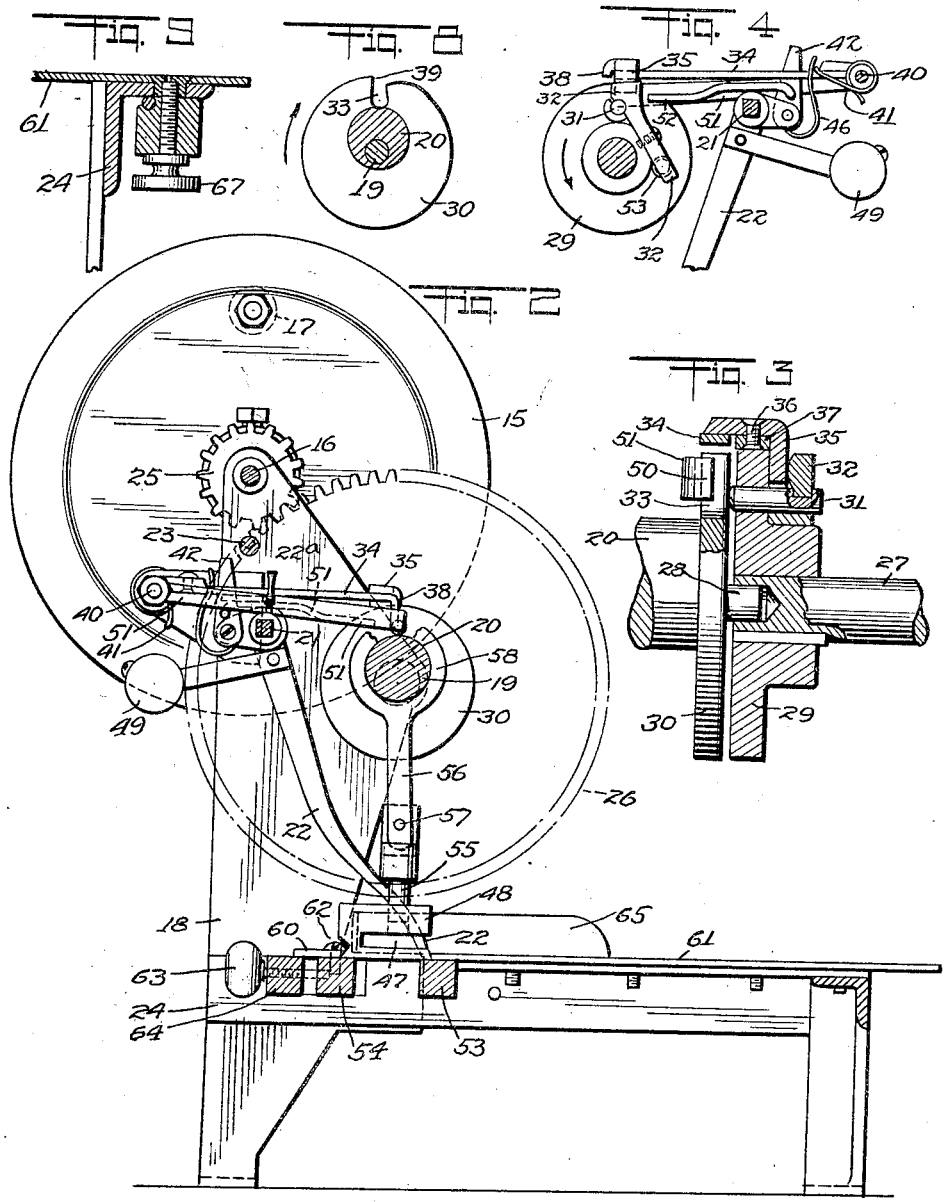

Patented Oct. 7, 1924.

1,511,052

UNITED STATES PATENT OFFICE.

AUGUSTUS N. DODS, OF MOUNT VERNON, NEW YORK.

PUNCHING MACHINE.

Application filed October 24, 1921. Serial No. 509,795.

*To all whom it may concern:*

Be it known that I, AUGUSTUS N. DODS, a citizen of the United States, and a resident of Mount Vernon, in the county of Westchester and State of New York, have invented certain new and useful Improvements in a Punching Machine, of which the following is a full, clear, and exact description.

Among the principal objects which the present invention has in view are: to provide a machine of the character mentioned which has single operation; to provide means for inaugurating the operation of the machine simultaneously with the placement of the work in position to be operated upon; to provide a machine of the character mentioned which is adapted for a limited service installation; to automatically suspend the operation of the machine at the completion of each operation.

Drawings.

Figure 1 is a front elevation of a machine constructed and arranged in accordance with the present invention.

Figure 2 is a vertical section of a machine taken on the line 2—2 in Figure 1.

Figure 3 is a detailed view on enlarged scale and partly in section showing the clutch for connecting the continuous driving mechanism and the intermittent driven mechanism and means for releasing the same.

Figure 4 is a detailed view of the clutch tripping mechanism.

Figures 5, 6 and 7 are detailed views on enlarged scale showing the successive operating positions of the clutch tripping mechanism with which the machine is provided.
Figure 8 is a detailed view showing the recessed clutch.

Figure 9 is a detailed view showing the setting gage and means for holding the same in adjusted position.
Figure 10 is a perspective view on enlarged scale of one of the die-blocks employed in the present invention.

Description.

The particular machine herein disclosed is primarily designed for installation where, what may be termed "occasion" work is required, or where a relatively limited amount of service is exhibited. With this purpose in view various formations of driving apparatus may be employed such as the hand-driven wheel 15 which is rigidly mounted on the shaft 16 and has a crank handle 17 suitably disposed. The shaft 16 is mounted in the side brackets 18. The brackets 18 serve as side members of the machine and furnish bearings for the shaft 19 on which the eccentric roller 20 is mounted.

Bearings are also provided in the said brackets 18 for the rocking shaft 21 on which the fingers 22 of the releasing mechanism are slidably mounted to be held in service position by set screws 22ᴬ. A tie rod 23 in conjunction with the table supporting frame 24 holds the said brackets rigid.

The shafts 16 and 19 are operatively connected by a pinion 25 and the gear wheel 26, the teeth of said pinion and gear wheel being meshed. The diameters of the pinion 25 and wheel 26 are so related that power transmitted by the said pinion is multiplied in its result on the shaft 27. One end of the shaft 19 has a bearing pintle 28 which rests in the flange wheel 29 as seen best in Fig. 3 of the drawings.

The pintle 28 is concentric with the shaft 19 and therefore eccentric to the roller 20. The roller 20 is rotated whenever the flange wheel 29 and clutch wheel 30 are operatively connected by the coupling pin 31.

The pin 31 is operatively connected to the spring-actuated arm 32, the function of which is to press the pin 31 into the recess 33 of the clutch wheel 30. The arm 32 is normally restrained from functioning in the manner indicated by the latch bar 34 and the hook 35 which is rigidly secured to the said bar. The hook 35 and bar 34 are adjustable by means of the screw 36 and the foot plate 37 connected therewith. By operating the screw 36 the plate 37 is moved to and from the cross piece of the hook 35, lifting or depressing the pendant end thereof, as well as the latch end 38 with which the hook 35 is provided.

The latch end 38 normally engages the shoulder 39 of the recess 33. The bar 34 is pivotally mounted on the short shaft 40. A coil spring 41 operates to normally depress the free end of the bar 34 and the hook 35 and the latch end 38 thereon. The spring 41 presses the latch end 38 on the periphery of the clutch wheel 30 so that the said latch end engages the shoulder 39 at the side of the recess 33 in the said clutch wheel 30 at every revolution thereof.

The free end of the latch 34 is lifted by the trigger 42 and the pin 43 thereon. Normally the pin 43 rests under the bar 34 as shown in Figures 5 and 6 of the drawings. When the trigger 42 is lifted as shown in Fig. 6 of the drawings from the position shown in Fig. 5 of the drawings, the bar 34 is rocked on the shaft 40 with the result that the latch end 38 is lifted from engagement with the shoulder 39 of the clutch wheel, and the hook 35 is withdrawn from the path of the arm 32.

The trigger 42 is pivotally mounted by the pin 44 on the short arm 45 mounted on the shaft 21. The trigger 42 is normally held in the position shown in Figures 5 and 6 by a spring 46; when the shaft 21 is rocked from the position shown in Figure 5 to the position shown in Figure 6.

It will be observed that the trigger 42 is elevated with the result that the bar 34 is elevated at the free end thereof, The shaft 21 is rocked in the manner indicated whenever the free ends of the fingers 22 are pressed back. This happens whenever paper or other material to be punched is pushed into the opening 47 of the dieblocks. This is due to the disposition of the free ends of the fingers 22 as shown in Figure 2 of the drawings, where they are normally disposed in line with the entrance end of the said recesses. The fingers are thus held by the weight 49 which over-balances said fingers and when any strain rocks the shaft 21 to place the said fingers in the position shown in Figure 2 of the drawings.

When the shaft 21 is rocked by the insertion of paper or other material in the recesses 47 of the die-blocks 48, the trigger 42 is lifted, pressing the pin 43 under the bar 34 to lift the latch end 38 and the hook 35, the one from the engagement of the shoulder 39, and the other from in front of the arm 32. The arm 32 being thus released presses toward the flange wheel 29 and presses the pin 31 into the recess 33 and against the hook end 50 of a second latch bar 51 displacing the said hook end 50 so that the clutch wheel 30 and roller 29 connected therewith are free to move with the flange wheel 29. After passing from engagement with the pin 31, the hook end 50 rests upon the side of the clutch wheel 30 being spring-pressed against the said wheel, ready to engage the recess 33 therein at the completion of each revolution of said clutch wheel. The latch end 38 of the bar 34 also rides on the periphery of the said clutch wheel ready to engage the shoulder 39 of the recess 33 at the completion of each revolution.

The arm 32 is normally held by the pin 31 out of the path of the trip rod 52. The trip rod 52 is rigidly connected with the trigger 42. When the cross bar 53 is permitted to rock the end of the arm 32 connected with the pin 31 to rest against the side of the flange wheel 29, it rests in the path of the free end of the trip rod 52 and thereby lifts the same when approaching the completion of the revolution of the said flange wheel.

When the free end of the trip rod 52 is elevated the trigger 42 is rotated on the shaft 44 compressing the spring 46 as shown in Fig. 7 of the drawings and releasing the pin 43 from the bar 34. The bar 34 being thus released permits the spring 41 to press the latch end 38 into the path of the shoulder 39. It also places the hook 35 in the path of the free end of the bar 32. The corner of the hook 35 is beveled to form a wedge or cam, which striking under the end of the bar 32 forces the same outward from the flange wheel 29 and removes the pin 31 from engagement with the recess 33, and from the path of the hook end 50 of the second latch bar 51 with the result that the clutch wheel 30 and roller 20 connected therewith are arrested, though the flange wheel 29 may continue to rotate.

It will be seen that when and as the end of the bar 32 passes out of engagement with the trip rod 52 the spring 46 is permitted to rock the trigger 42 until the pin 43 again passes below the latch bar 34 ready to elevate the same, when again operated to that effect.

The die-blocks 48 are supported by cross bars 53 and 53. The blocks are vertically perforated to form female die sections through which the die punches 55 extend. The punches 55 are reciprocatively mounted in the blocks 48 and are pivotally united with the connecting rods 56 by means of pins 57, one of which is set out from each of the heads of the punches 55. The end of each connecting rod extends into recesses 59 in each plunger head 55. The short side of the head which forms the recess 59 in each plunger operates as a guide for the end of each connecting rod.

When the connecting rods are disposed in perpendicular relation to the plungers, the ends of the plungers are lifted above the edge of the short side referred to so that they can be removed from engagement with the pins 57 and new plungers substituted therefor. It will be observed that the connecting rods 56 may be freely moved lengthwise of the roller 20. The purpose of this construction is to permit the dies to be freely adjusted in their spread relation. The die-blocks 48 are held rigidly in service position by the overhanging edge of the retainer plate 60 and the overhanging edge of the table 61. The lower section of each die-block is outwardly flared to fit beneath the overhanging edges of the said plate 60 and table 61.

The plate 60 is rigidly held in service upon the bar 54 by screws 62. The bar 54 is slidable to and from the bar 53 being operated to that effect by wing screws 63 which are operatively mounted in a cross bar 64.

It is obvious that when the screws 63 are operated to draw back the bar 54 and the plate 60 therewith, the blocks 48 are released to be removed from the machine or shifted sidewise thereon. This permits the quick and easy substitution of other die-blocks to correspond with substituted plungers or the re-adjustment of the dies for perforations in the material being treated in accordance with the design of the operator.

The gage plates 65 and 66 are slidably adjustable across the table 61 to be locked in adjusted position by means of set screws 67.

While I have herein shown driving means embodying the crank wheel 15 having the crank handle 17 it will be understood, any suitable mechanical prime mover may be substituted therefor.

Claims.

1. A machine as characterized comprising a plurality of punch apparatuses, each embodying a die block and punch reciprocatively mounted therein; means for reciprocating said punch; and automatic means for arresting said punch at the completion of its operation, said means embodying a clutch, and a latch normally operated for arresting the movement of said clutch.

2. A machine as characterized comprising a plurality of punch apparatuses, each embodying a die block and punch reciprocatively mounted therein; means for reciprocating said punch; automatic means for arresting said punch at the completion of its operation, said means embodying a clutch, and a latch normally operated for arresting the movement of said clutch; and means for inaugurating the operation of said clutch, said means being automatically engaged by the material to be treated as and when moved into position to be operated upon by said punch.

3. A machine as characterized comprising a plurality of punch apparatuses, each embodying a die block having a guide and die member; a plurality of punches, each reciprocatively mounted in one of said guide members; and means for reciprocating said punches embodying a continuously operating driving mechanism, and a single revolution mechanism for reciprocating said punch, once only.

4. A machine as characterized comprising a plurality of punch apparatuses, each embodying a die block having a guide and die member; a plurality of punches, each reciprocatively mounted in one of said guide members; means for reciprocating said punches embodying a continuously operating driving mechanism, and a single revolution mechanism for reciprocating said punch, once only; and means operatively connecting said driving mechanism and single revolution mechanism, said means being operatively disposed by the introduction of the material to be punched within said die block.

5. A machine as characterized comprising a plurality of punch apparatuses, each embodying a guide block having a guide and a die member, and a punch corresponding to said die member, a reciprocating mechanism for said punch embodying a rotary shaft having an eccentric member, and a connecting rod pivotally engaging said eccentric member and said plunger.

6. A machine as characterized comprising a plurality of punch apparatuses, each embodying a guide block having a guide and a die member, and a punch corresponding to said die member, a reciprocating mechanism for said punch embodying a rotary shaft having an eccentric member, and a connecting rod pivotally engaging said eccentric member and said plunger; means for guiding said connecting rod, said means embodying a slot in said guide member for maintaining the working position of said connecting rod.

7. A machine as characterized comprising a plurality of punch apparatuses, each embodying a guide block having a guide and a die member, and a punch corresponding to said die member, a reciprocating mechanism for said punch embodying a rotary shaft having an eccentric member, and a connecting rod pivotally engaging said eccentric member and said plunger; means for guiding said connecting rod, said means embodying a slot in said guide member for maintaining the working position of said connecting rod, one side of said slot being abbreviated to permit the passage thereover of said connecting rod when said connecting rod is disposed in perpendicular relation to said block.

8. A machine as characterized comprising a plurality of punch apparatuses, each embodying a punch and a die block; a reciprocating mechanism for said punches embodying an elongated continuous roller eccentrically mounted in parallel relation to said die blocks; and a plurality of connecting rods, each pivotally engaging said punches and having a circular collar enfolding said roller to be moved freely lengthwise thereof.

9. A machine as characterized comprising a plurality of punch apparatuses, each embodying a punch and a die block; a reciprocating mechanism for said punches embodying an elongated continuous roller eccentrically mounted in parallel relation to said die blocks; a plurality of connecting rods, each pivotally engaging said punches and having a circular collar enfolding said roller to be moved freely lengthwise thereof; a mounting for said die blocks embodying parallel supporting members on which said blocks are free to slide lengthwise thereof; and clamping means engaging said die blocks for holding them stationarily on said supporting members.

10. A machine as characterized comprising a plurality of punch apparatuses, each embodying a punch and a die block; a reciprocating mechanism for said punches embodying an elongated continuous roller eccentrically mounted in parallel relation to said die blocks; a plurality of connecting rods, each pivotally engaging said punches and having a circular collar enfolding said roller to be moved freely lengthwise thereof; a mounting for said die blocks embodying parallel supporting members on which said blocks are free to slide lengthwise thereof; and clamping means engaging said die blocks for holding them stationarily on said supporting members, said means embodying a clamping plate adapted to overhang the edge of all of said blocks, and a series of feed screws for advancing and retracting said plate.

11. A machine as characterized comprising a plurality of reciprocating punches; an operating mechanism therefor embodying a continuously operating driving mechanism having a clutch member, an intermittent driving mechanism having an eccentric roller, and a clutch member rigidly connected with said roller, a plurality of connecting rods, each operatively engaging said roller and one of said punches; means operated by material being fed to the punch couples for operatively connecting said clutch members.

12. A machine as characterized comprising a plurality of reciprocating punches; an operating mechanism therefor embodying a continuously operating driving mechanism having a clutch member, an intermittent driving mechanism having an eccentric roller, and a clutch member rigidly connected with said roller, a plurality of connecting rods each operatively engaging said roller and one of said punches; means operated by material being fed to the punch couples for operatively connecting said clutch members; and automatic means for disconnecting said clutch members during each joint revolution of said members.

13. A machine as characterized comprising a plurality of reciprocating punches; an operating mechanism therefor embodying a continuously operating driving mechanism having a clutch member, an intermittent driving mechanism having an eccentric roller, and a clutch member rigidly connected with said roller; a plurality of connecting rods each operatively engaging said roller and one of said punches; means operated by material being fed to the punch couples for operatively connecting said clutch members; and automatic means for disconnecting said clutch members during each joint revolution of said members, said means embodying an engaging pin and support therefor, a latch bar for engaging one of said clutch members, and a trigger operatively engaged by said pin during the revolution of said clutches, said trigger being adapted for holding said latch bar out of engagement with said clutch until sprung by said pin.

14. A machine as characterized comprising a continuously operating driving mechanism having a clutch member; an intermittently driving mechanism having a clutch member, and an eccentric roll rigidly connected therewith, said clutch member being disposed in parallel and juxtaposed relation to the first mentioned clutch member; a latch bar for normally holding said second clutch member from rotating; a connecting pin reciprocatively mounted on the first mentioned clutch member for engaging the second clutch member when permitted to do so; a trigger mechanism for lifting said latch bar from engagement with said clutch member; and means operatively engaging said trigger mechanism for lifting said latch bar when the material to be treated is fed to said machine.

15. A machine as characterized comprising a continuously operating driving mechanism having a clutch member; an intermittently driving mechanism having a clutch member, and an eccentric roll rigidly connected therewith, said clutch member being disposed in parallel and juxtaposed relation to the first mentioned clutch member; a latch bar for normally holding said second clutch member from rotating; a connecting pin reciprocatively mounted on the first mentioned clutch member for engaging the second clutch member when permitted to do so; a trigger mechanism for lifting said latch bar from engagement with said clutch member; and means operatively engaging said trigger mechanism for lifting said latch bar when the material to be treated is fed to said machine, said trigger mechanism embodying a rocking shaft having a short lifting arm, a trigger pivotally mounted on said lifting arm while engaged with said latch bar, and a tripping arm rigidly connected with said trigger and extending into the path of said connecting pin when operatively engaging said intermittent mechanism to be elevated thereby for rocking said trigger out of engagement with said latch bar.

16. A machine as characterized comprising a continuously operating driving mechanism having a clutch member; an intermittently driving mechanism having a clutch member, and an eccentric roll rigidly connected therewith, said clutch member being disposed in parallel and juxtaposed relation to the first mentioned clutch member; a latch bar for normally holding said second clutch member from rotating; a connecting pin reciprocatively mounted on the first mentioned clutch member for engaging the second clutch member when permitted to do so; a trigger mechanism for lifting said latch bar from engagement with said clutch member; and means operatively engaging said trigger mechanism for lifting said latch bar when the material to be treated is fed to said machine, said trigger mechanism embodying a rocking shaft having a short lifting arm, a trigger pivotally mounted on said lifting arm while engaged with said latch bar, a tripping arm rigidly connected with said trigger and extending into the path of said connecting pin when operatively engaging said intermittent mechanism to be elevated thereby for rocking said trigger out of engagement with said latch bar, and a second clutch bar adapted for engaging said second mentioned clutch member at the completion of each revolution thereof; and means for temporarily removing said second mentioned clutch bar from engagement with said second mentioned clutch member.

17. A machine as characterized comprising a continuously operating driving mechanism having a clutch member; an intermittently driving mechanism having a clutch member, and an eccentric roll rigidly connected therewith, said clutch member being disposed in parallel and juxtaposed relation to the first mentioned clutch member; a latch bar for normally holding said second clutch member from rotating; a connecting pin reciprocatively mounted on the first mentioned clutch member for engaging the second clutch member when permitted to do so; a trigger mechanism for lifting said latch bar from engagement with said clutch member; means operatively engaging said trigger mechanism for lifting said latch bar when the material to be treated is fed to said machine, said trigger mechanism embodying a rocking shaft having a short lifting arm, a trigger pivotally mounted on said lifting arm while engaged with said latch bar, a tripping arm rigidly connected with said trigger and extending into the path of said connecting pin when operatively engaging said intermittent mechanism to be elevated thereby for rocking said trigger out of engagement with said latch bar, and a second clutch bar adapted for engaging said second mentioned clutch member at the completion of each revolution thereof; and means for temporarily removing said second mentioned clutch bar from engagement with said second mentioned clutch member, said means embodying said connecting pin.

AUGUSTUS N. DODS.